(12) United States Patent
Shoji et al.

(10) Patent No.: US 10,374,268 B2
(45) Date of Patent: Aug. 6, 2019

(54) BATTERY MODULE

(71) Applicant: Yazaki Corporation, Tokyo (JP)

(72) Inventors: Takao Shoji, Shizuoka (JP); Shinichi Yanagihara, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 10 days.

(21) Appl. No.: 15/714,639

(22) Filed: Sep. 25, 2017

(65) Prior Publication Data

US 2018/0097263 A1    Apr. 5, 2018

(30) Foreign Application Priority Data

Oct. 5, 2016  (JP) .................................. 2016-197014

(51) Int. Cl.
*H01M 2/02* (2006.01)
*H01M 10/48* (2006.01)
*H01M 2/10* (2006.01)
*H01M 2/30* (2006.01)
*H01M 2/20* (2006.01)

(52) U.S. Cl.
CPC ......... *H01M 10/48* (2013.01); *H01M 2/1005* (2013.01); *H01M 2/1016* (2013.01); *H01M 2/202* (2013.01); *H01M 2/30* (2013.01)

(58) Field of Classification Search
CPC .... H01M 10/48; H01M 2/202; H01M 2/1005; H01M 2/30; H01M 2/1016
See application file for complete search history.

(56) References Cited

U.S. PATENT DOCUMENTS

2012/0114984 A1    5/2012   Kim et al.

FOREIGN PATENT DOCUMENTS

| JP | 2012-84297 A | 4/2012 |
|---|---|---|
| JP | 2012-99355 A | 5/2012 |
| JP | 3190872 U | 6/2014 |

OTHER PUBLICATIONS

Japanese Office Action for the related Japanese Patent Application No. 2016-197014 dated Jan. 8, 2019.
Japanese Office Action for the related Japanese Patent Application No. 2016-197014 dated May 7, 2019.

*Primary Examiner* — Cynthia K Walls
(74) *Attorney, Agent, or Firm* — Kenealy Vaidya LLP (57) ABSTRACT

A battery module includes a plurality of battery cells each having two electrode terminals, i.e., positive and negative electrode terminals; a first housing case that houses a first battery cell group; a second housing case that houses a second battery cell group; and a fixing tool that fixes the first and the second housing cases by making the electrode terminals in the first battery cell group face the electrode terminals in the second battery cell group. The second battery group is housed in the second housing case while being inclined relative to the first battery cell group, connected to the negative electrode terminal of each battery cell in the first battery cell group facing the positive electrode terminal of the battery cell, and connected to the positive electrode terminal of each battery cell in the first battery cell group facing the negative electrode terminal of the battery cell.

4 Claims, 5 Drawing Sheets

BATTERY MODULE

CROSS-REFERENCE TO RELATED APPLICATION(S)

The present application claims priority to and incorporates by reference the entire contents of Japanese Patent Application No. 2016-197014 filed in Japan on Oct. 5, 2016.

BACKGROUND OF THE INVENTION

1. Field of the Invention

The present invention relates to a battery module.

2. Description of the Related Art

A battery module in which a plurality of battery cells having two electrode terminals, namely, positive and negative electrode terminals, are connected in series has been known. In the battery module, the battery cells are respectively housed in a plurality of housing space portions that are formed in a casing in an aligned manner. In the battery module, the battery cells are connected in series, because each of a plurality of bus bars connects the positive electrode terminal and the negative electrode terminal of the battery cells that are adjacent to each other in an arranging direction (see Japanese Patent Application Laid-open No. 2012-84297). Moreover, a voltage detection line is connected to the bus bar. For example, the voltage detection line is connected to an electronic control unit (ECU) mounted on a vehicle, and is used for controlling the charging of the battery module and the like, by outputting voltage information of the battery cell to which the bus bar is connected.

When a bus bar is used to connect the battery cells, the number of bus bars about the same as that of the housed battery cells is required. Thus, it is difficult to reduce the manufacturing cost of the battery module. Moreover, a process of fixing each of the bus bars to the electrode terminals is required during the assembly of the battery module. Hence, it is difficult to reduce manufacturing time and improve the workability.

SUMMARY OF THE INVENTION

The present invention has been made in view of the above, and the object of the present invention is to provide a battery module capable of connecting battery cells without using a bus bar.

In order to achieve the above mentioned object, a battery module according to one aspect of the present invention includes a plurality of battery cells each having two electrode terminals of positive and negative electrode terminals; a first housing case housing a first battery cell group formed of a part of the battery cells; a second housing case housing a second battery cell group formed of the battery cells different from the battery cells in the first battery cell group; and a fixing tool fixing the first housing case and the second housing case in a fixed state by making the electrode terminals in the first battery cell group face the electrode terminals in the second battery cell group, wherein the second battery cell group is housed in the second housing case while being inclined relative to the first battery cell group, connected to the negative electrode terminal of each of the battery cells in the first battery cell group facing the positive electrode terminal of the battery cell, and connected to the positive electrode terminal of each of the battery cells in the first battery cell group facing the negative electrode terminal of the battery cell.

According to another aspect of the present invention, in the battery module, it is possible to further include that a voltage detector interposed between the first housing case and the second housing case in the fixed state, the voltage detector outputting voltage information of the battery cells to outside.

According to still another aspect of the present invention, in the battery module, it is possible to configure that the voltage detector includes a base unit having a sheet-like shape interposed between the electrode terminals in the first battery cell group and the electrode terminals in the second battery cell group, the electrode terminals in the first battery cell group and the electrode terminals in the second battery cell group being connected facing each other, and a voltage detection conductor provided on the base unit the voltage detection conductor being connected to at least one of the electrode terminals, of the electrode terminals connected facing each other.

According to still another aspect of the present invention, in the battery module, it is possible to configure that a plurality of the voltage detection conductors are provided on the base unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the accompanying drawings. It is to be noted that the present invention is not limited to the embodiment. Moreover, components in the following embodiment include components that can be easily replaced by a person skilled in the art or components that are substantially the same.

Embodiment

Figure 1:
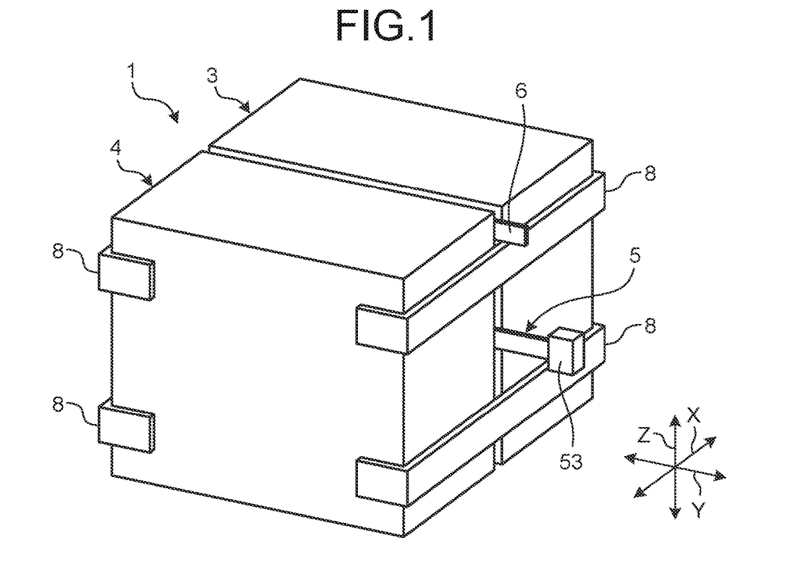
FIG. 1 is a perspective view of a battery module according to an embodiment.
Figure 2:
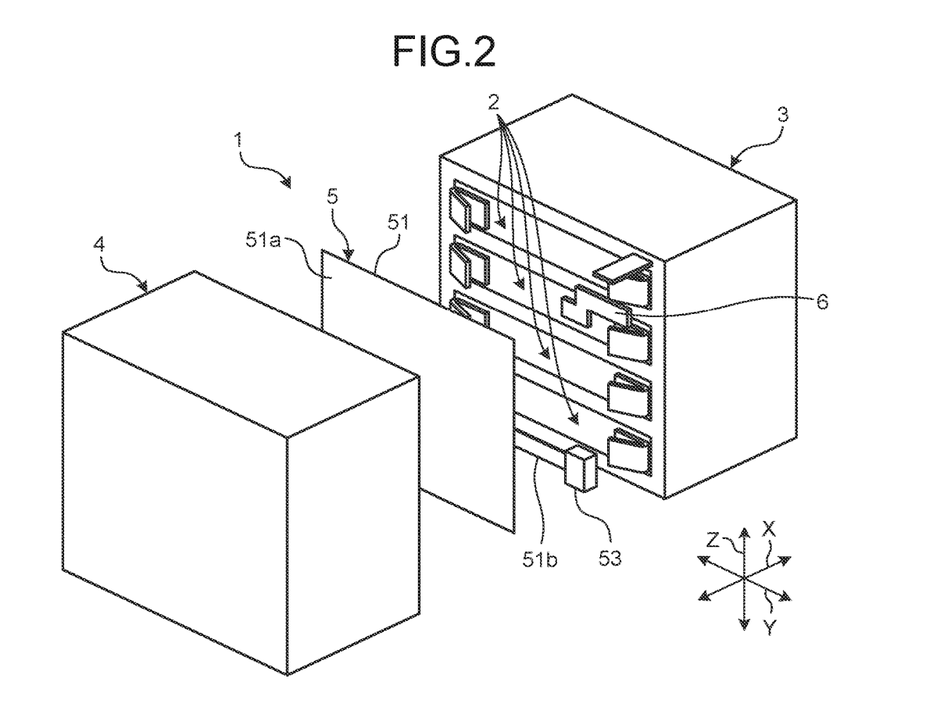
FIG. 2 is a partially exploded perspective view of the battery module according to the embodiment.

FIG. 1 is a perspective view of a battery module according to an embodiment. FIG. 2 is a partially exploded perspective view of the battery module according to the embodiment.

Figure 3:
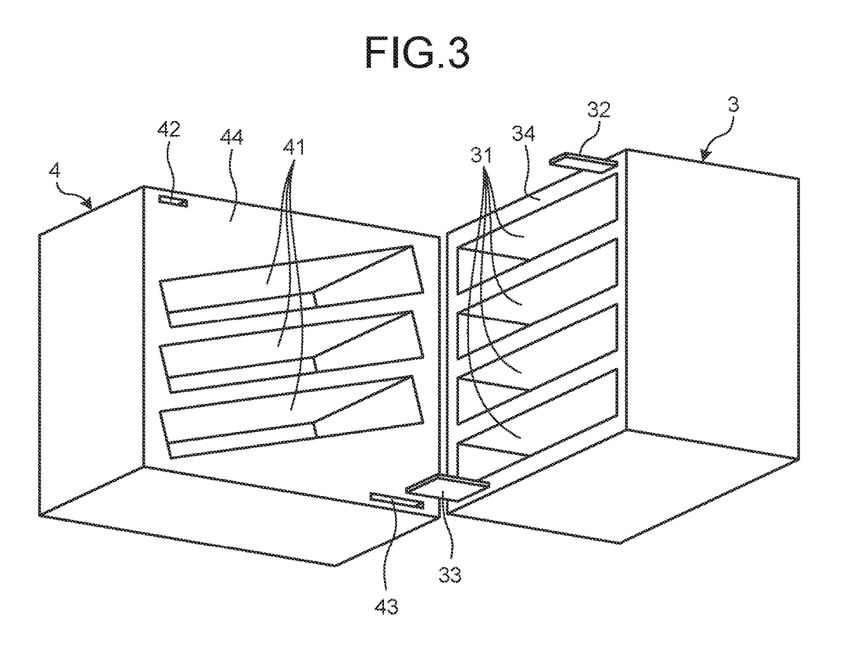
FIG. 3 is a perspective view of a first housing case and a second housing case of the battery module according to the embodiment.
Figure 4:
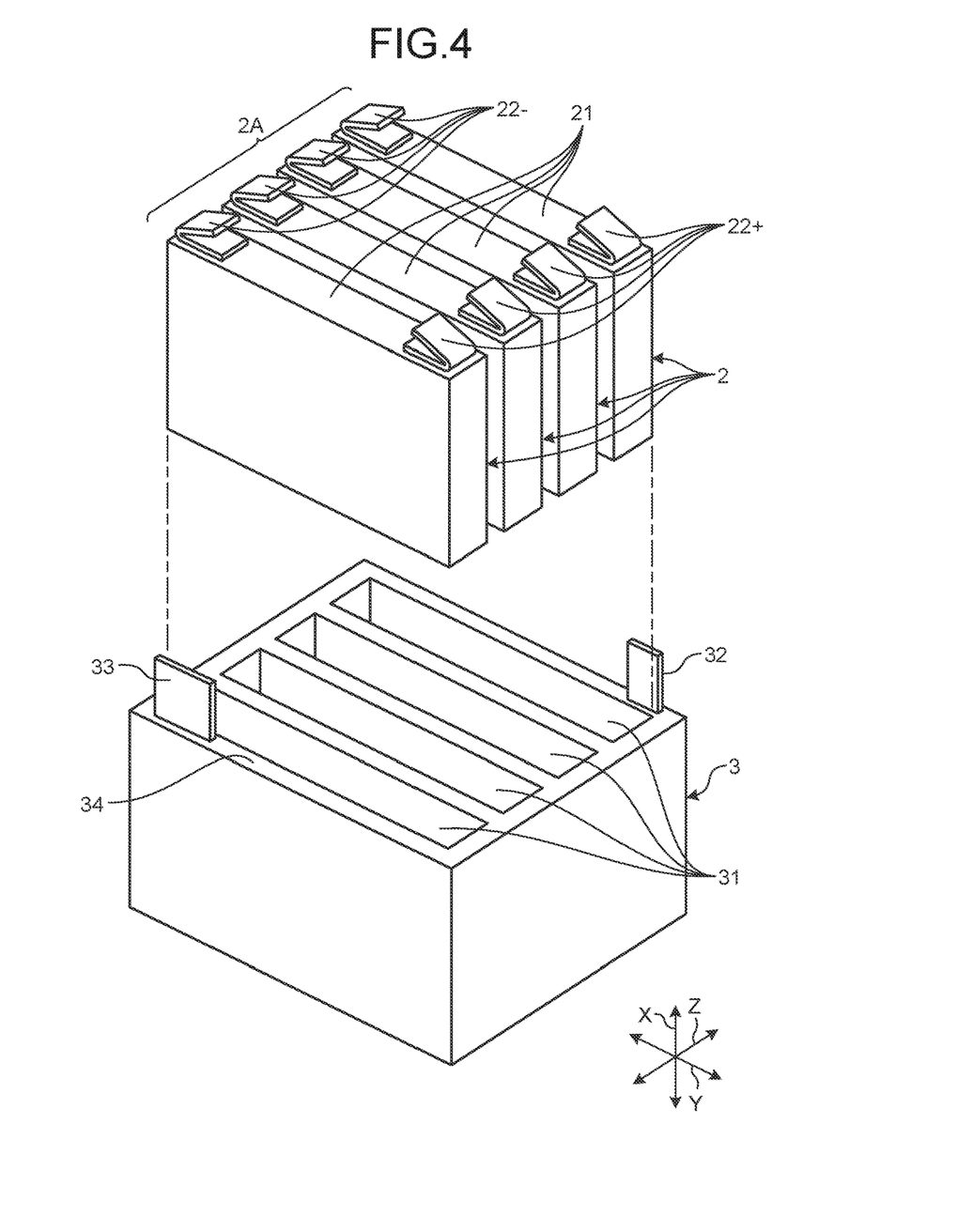
FIG. 4 is a perspective view of the first housing case and a first battery cell group of the battery module according to the embodiment.
Figure 5:
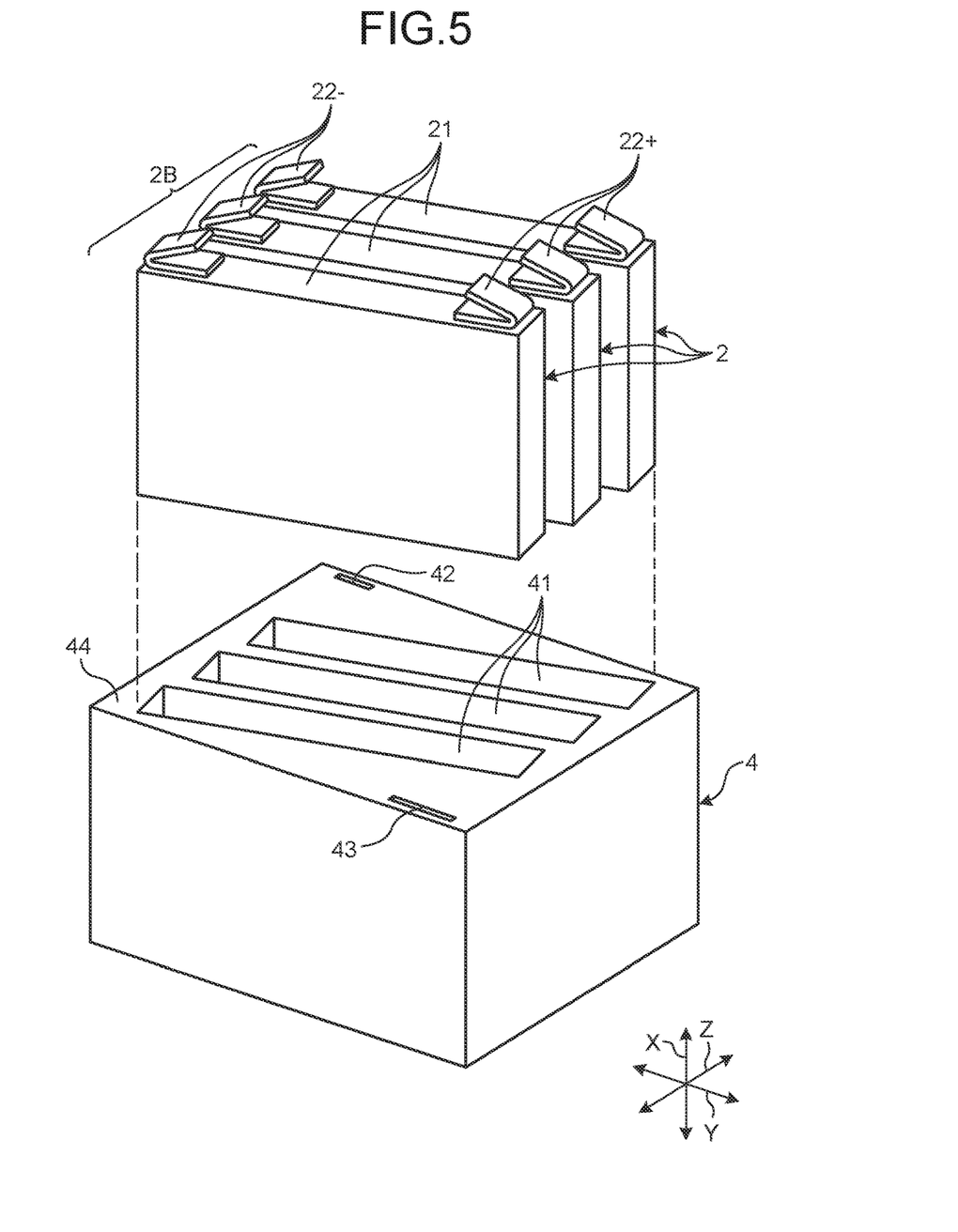
FIG. 5 is a perspective view of the second housing case and a second battery cell group of the battery module according to the embodiment.
Figure 6:
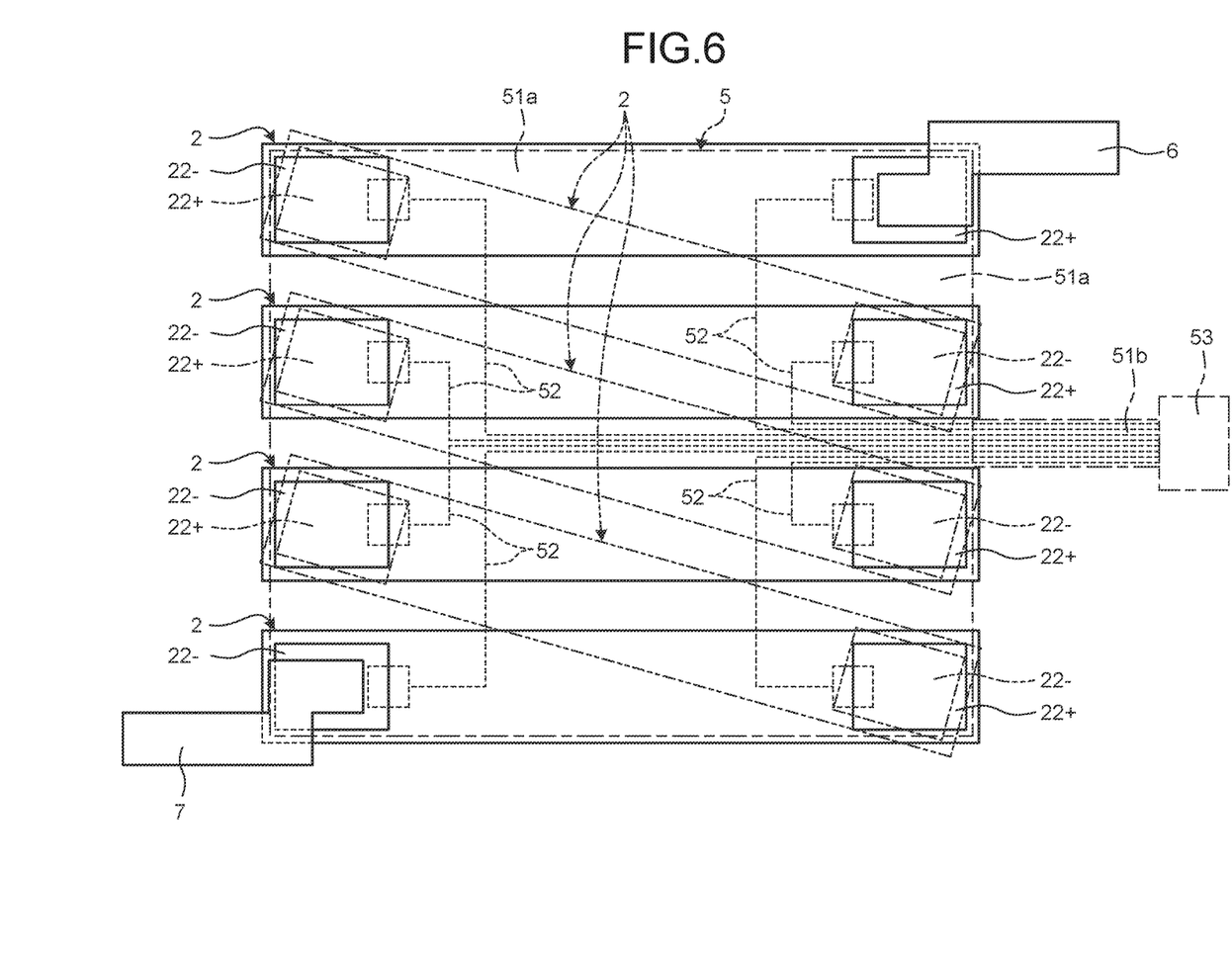
FIG. 6 is a diagram illustrating a positional relation between the first battery cell group, the second battery cell group, and a voltage detector.

FIG. 3 is a perspective view of a first housing case and a second housing case of the battery module according to the embodiment. FIG. 4 is a perspective view of the first housing case and a first battery cell group of the battery module according to the embodiment. FIG. 5 is a perspective view of the second housing case and a second battery cell group of the battery module according to the embodiment. FIG. 6 is a diagram illustrating a positional relation between the first battery cell group, the second battery cell group, and a voltage detector. Here, FIG. 2 is an exploded perspective view of the battery module without fixing tools. The X direction in each of the diagrams is a width direction of the battery module of the present embodiment, and is an opposing direction of electrode terminals. The Y direction is a depth direction of the battery module of the present embodiment, and is a direction perpendicular to the width direction. The Z direction is a vertical direction of the battery module, and is an arranging direction of the battery cells. The Z direction is also a direction perpendicular to the width direction and the depth direction.

For example, a battery module 1 of the present embodiment is mounted on an electric vehicle (EV) and a hybrid vehicle (HV and PHV), and used to supply electric power to a rotating electric machine that is a driving source, and store (charge) the electric power generated by the rotating electric machine. As illustrated in FIG. 1 to FIG. 6, the battery module 1 makes it possible to obtain high output power corresponding to the required output of the vehicle, by connecting a plurality of battery cells 2 in series. The battery module 1 includes the battery cells 2, a first housing case 3, a second housing case 4, a voltage detector 5, a pair of terminal electrodes 6 and 7, and fixing tools 8.

The battery cells 2 are secondary batteries such as nickel hydride batteries and lithium ion batteries that can be charged and discharged repeatedly. As illustrated in FIG. 2, FIG. 4, and FIG. 5, each of the battery cells 2 of the present embodiment has a rectangular parallelepiped shape, and two electrode terminals 22 and 22, namely, a positive electrode terminal 22+ and a negative electrode terminal 22−, having conductivity are formed on an electrode surface 21. The positive electrode terminal 22+ and the negative electrode terminal 22− are formed on both ends of the electrode surface 21 in the longitudinal direction, and are separated from each other. The positive electrode terminal 22+ and the negative electrode terminal 22− of the present embodiment are formed of an elastic conductive material such as metal leaf springs, and are elastically deformable. When the battery cell 2 is viewed from the vertical direction (side surface side), the positive electrode terminal 22+ and the negative electrode terminal 22− are each formed in a V-shape having an opening toward the center portion of the electrode surface 21 in the longitudinal direction. One of the ends of the positive electrode terminal 22+ and the negative electrode terminal 22− is fixed to the electrode surface 21, and the other end of the positive electrode terminal 22+ and the negative electrode terminal 22− is separated from the electrode surface 21 in the vertical direction of the battery cell 2. In fact, when the positive electrode terminal 22+ and the negative electrode terminal 22− are pressed toward the electrode surface 21 side, the positive electrode terminal 22+ and the negative electrode terminal 22− are elastically deformed toward the electrode surface 21 side. Here, the battery cells 2 are divided into a first battery cell group 2A and a second battery cell group 2B. The first battery cell group 2A is a part of the battery cells 2, and is the battery cells 2 to be housed in the first housing case 3. The second battery cell group 2B is a part of the battery cells 2, and is the battery cells 2 to be housed in the second housing case 4. In present embodiment, the number of the battery cells 2 in the second battery cell group 2B is smaller by one than the number of the battery cells 2 in the first battery cell group 2A.

As illustrated in FIG. 2 to FIG. 4, the first housing case 3 houses the first battery cell group 2A. The first housing case 3 makes the electrode terminals 22 of each of the battery cells 2 in the first battery cell group 2A that are housed in the first housing case 3, opposed to the electrode terminals 22 of each of the battery cells 2 in the second battery cell group 2B. The first housing case 3 in the present embodiment has a rectangular parallelepiped shape, and includes a plurality of housing space portions 31, a first insertion piece 32, and a second insertion piece 33. The housing space portions 31 each house the battery cell 2 in the first battery cell group 2A, and are aligned in the vertical direction. The housing space portions 31 house the battery cells 2 so that the positive electrode terminals 22+ and the negative electrode terminals 22− of the battery cells 2 in the first battery cell group 2A to be housed are aligned in the arranging direction of the battery cells 2, in other words, in the vertical direction. Here, the first housing case 3 houses the battery cells 2 so that the positive electrode terminals 22+ and the negative electrode terminals 22− of the battery cells 2 in the first battery cell group 2A to be housed are aligned in the arranging direction of the battery cells 2, in other words, in the vertical direction. The housing space portions 31 are formed in parallel in the depth direction, and house the battery cells 2 in the first battery cell group 2A in parallel in the depth direction. Each of the housing space portions 31 is communicably connected to an opening formed on an opposite surface 34 of the first housing case 3 at the second housing case 4 side in the width direction, and when viewed from the depth direction while the battery cells 2 are housed in the housing space portions 31, each of the housing space portion 31 houses the battery cell 2 in a state that the electrode terminals 22 are projected from the opening towards the second housing case 4 side. The first insertion piece 32 is inserted into a first insertion hole 42, which will be described below, and in the present embodiment, the first insertion piece 32 is formed in a plate shape. The first insertion piece 32 is formed on one of the ends of the opposite surface 34 in the vertical direction, and on one of the ends of the opposite surface 34 in the depth direction. The second insertion piece 33 is inserted into a second insertion hole 43, which will be described below, and in the present embodiment, formed in a plate shape. The second insertion piece 33 is formed on the other end of the opposite surface 34 in the vertical direction, and on the other end of the opposite surface 34 in the depth direction. Here, the second insertion piece 33 has a shape different from a shape of the first insertion piece 32, and in the present embodiment, the second insertion piece 33 is formed larger than the first insertion piece 32.

As illustrated in FIG. 2, FIG. 3, and FIG. 5, the second housing case 4 houses the second battery cell group 2B. The second housing case 4 makes the electrode terminals 22 of each of the battery cells 2 in the second battery cell group 2B that are housed in the second housing case 4, opposed to the electrode terminals 22 of each of the battery cells 2 in the first battery cell group 2A. The second housing case 4 of the present embodiment has a rectangular parallelepiped shape, and includes a plurality of housing space portions 41, the first insertion hole 42, and the second insertion hole 43. Here, the second housing case 4 houses the battery cells 2 so that the positive electrode terminal 22+ and the negative electrode terminal 22− of the battery cells 2 in the second battery cell group 2B to be housed are aligned in the arranging direction of the battery cells 2, in other words, in the vertical direction. The housing space portions 41 each house the battery cell 2 in the second battery cell group 2B, and are aligned in the vertical direction. The housing space portions 41 are inclined relative to the depth direction, and each house the battery cell 2 in the second battery cell group 2B in an inclined manner relative to the depth direction. Here, while the first housing case 3 and the second housing case 4 are being fixed by the fixing tools 8 and are in a fixed state, the housing space portions 41 are inclined relative to the depth direction (see FIG. 1, and FIG. 3). Thus, the positive electrode terminal 22+ of each of the battery cells 2 in the second battery cell group 2B housed in the housing space portion 41 is facing the negative electrode terminal 22− of each of the battery cells 2 in the first battery cell group 2A housed in the first housing case 3 (see FIG. 3 to FIG. 6). In other words, the positive electrode terminal 22+ of each of the battery cells 2 in the second battery cell group 2B housed in the housing space portion 41 is opposed to the negative electrode terminal 22− of each of the battery cells 2 in the first battery cell group 2A housed in the first housing case 3 in the width direction. Moreover, the negative electrode terminal 22− of each of the battery cells 2 in the second battery cell group 2B housed in the housing space portion 41 is facing the positive electrode terminal 22+ of each of the battery cells 2 in the first battery cell group 2A housed in the first housing case 3. In other words, the negative electrode terminal 22− of each of the battery cells 2 in the second battery cell group 2B housed in the housing space portion 41 is opposed to the positive electrode terminal 22+ of each of the battery cells 2 in the first battery cell group 2A housed in the first housing case 3 in the width direction. The housing space portion 41 is communicably connected to an opening formed on an opposite surface 44 of the second housing case 4 at the first housing case 3 side in the width direction, and when viewed from the depth direction while the battery cells 2 are housed in the housing space portion 41, the housing space portion 41 houses the battery cell 2 in a state that the electrode terminals 22 are projected from the opening toward the first housing case 3 side. The first insertion piece 32 is inserted into the first insertion hole 42, and the first insertion hole 42 is formed in a shape so as to prevent the inserted first insertion piece 32 from moving in the width direction and the depth direction. The first insertion hole 42 is formed on one of the ends of the opposite surface 44 in the vertical direction and on one of the ends of the opposite surface 44 in the depth direction. The second insertion piece 33 is inserted into the second insertion hole 43, and the second insertion hole 43 is formed in a shape so as to prevent the inserted second insertion piece 33 from moving in the width direction and the depth direction. The second insertion hole 43 is formed on the other end of the opposite surface 44 in the vertical direction and on the other end of the opposite surface 44 in the depth direction. Here, the second insertion hole 43 has a shape different from a shape of the first insertion hole 42, and in the present embodiment, the second insertion hole 43 is formed larger than the first insertion hole 42.

As illustrated in FIG. 1, FIG. 2, and FIG. 6, the voltage detector 5 outputs voltage information of each of the battery cells 2 that is connected via each of a plurality of voltage detection conductors 52, to the outside. While the first housing case 3 and the second housing case 4 are being fixed, the voltage detector 5 is interposed between the first housing case 3 and the second housing case 4. The voltage detector 5 includes a base unit 51, the voltage detection conductors 52 and a connector 53. The voltage information is supplied to the ECU, which is not illustrated, mounted on a vehicle via the connector 53, and is used to control the charging and discharging of the battery module 1 on the basis of the acquired voltage information.

The voltage detection conductors 52 are provided on the base unit 51. The base unit 51 of the present embodiment is a single flexible printed board having flexibility, and provided with the voltage detection conductors 52. The base unit 51 has a sheet-like shape, and includes a main body unit 51a and a connection unit 51b. The main body unit 51a is formed in a plate-like shape, and is interposed between the electrode terminals 22 in the first battery cell group 2A and the electrode terminals 22 in the second battery cell group 2B Here, the electrode terminals 22 in the first battery cell group 2A and the electrode terminals 22 in the second battery cell group 2B are connected facing each other. As illustrated in FIG. 6, while the first housing case 3 and the second housing case 4 are in a fixed state, the positive electrode terminal 22+ of one of the battery cells 2 and the negative electrode terminal 22− of the other battery cell 2 of the two battery cells 2 facing each other come into contact with each other on the contact surface. Both ends of the main body unit 51a in the depth direction are disposed so as to overlap with a part of the contact surface in the width direction. Here, the base unit 51 is held between the two facing electrode terminals 22, by the elastic return force of the two facing electrode terminals 22. Moreover, the base unit 51 is fixed between the first housing case 3 and the second housing case 4. The connection unit 51b is projected outside the battery module 1 in one direction in the depth direction, and the connector 53 is mounted on the tip end portion of the connection unit 51b.

The voltage detection conductors 52 are provided on the base unit 51, and each of the voltage detection conductors 52 is connected to at least one of the electrode terminals 22 of the two electrode terminals 22 that are connected facing each other. The voltage detection conductors 52 of the present embodiment are formed on the base unit 51 as printed wires, and each of the voltage detection conductors 52 is connected to the electrode terminal 22 of the battery cell 2 in the first battery cell group 2A that is facing the electrode terminal 22 of the battery cell 2 in the second battery cell group 2B, among the electrode terminals 22 of the battery cell 2 in the first battery cell group 2A. The voltage detection conductors 52 are formed on one of the surfaces of the base unit 51 in the width direction, at the side opposite from the first battery cell group 2A. Each of the voltage detection conductors 52 is formed on the base unit 51 up to the position where one of the ends of the voltage detection conductor 52 is opposed to the electrode terminals 22 that are connected facing each other, in the width direction. The other end of the voltage detection conductor 52 is connected to a terminal, which is not illustrated, of the connector 53 via the connection unit 51b.

The pair of terminal electrodes 6 and 7 connect the battery cells 2 that are connected in series in the battery module 1 with an external electronic device. The pair of terminal electrodes 6 and 7 are each made of a metal plate having conductivity. In the present embodiment, as illustrated in FIG. 6, the terminal electrode 6 is a positive terminal electrode, and the terminal electrode 7 is a negative terminal electrode. While the first housing case 3 and the second housing case 4 are in a fixed state, the pair of terminal electrodes 6 and 7 are disposed so as to overlap with the electrode terminals 22 of the battery cell 2 in the first battery cell group 2A that are not connected facing the electrode terminals 22 of the battery cell 2 in the second battery cell group 2B, among the electrode terminals 22 of the battery cell 2 in the first battery cell group 2A, in the width direction. In other words, the pair of terminal electrodes 6 and 7 are disposed so as to overlap with the positive electrode terminal 22+ of the battery cell 2 that is placed at one end side in the vertical direction and the negative electrode terminal 22− of the battery cell 2 that is placed at the other end side in the vertical direction, in the width direction. Here, the terminal electrode 6 is held between the positive electrode terminal 22+ and the opposite surface 44 by the elastic return force of the positive electrode terminal 22+. The terminal electrode 7 is held between the negative electrode terminal 22− and the opposite surface 34 by the elastic return force of the negative electrode terminal 22−. Consequently, the pair of terminal electrodes 6 and 7 are fixed between the first housing case 3 and the second housing case 4.

The fixing tools 8 fix the first housing case 3 and the second housing case 4 so that the electrode terminals 22 in the first battery cell group 2A face the electrode terminals 22 in the second battery cell group. The fixing tools 8 of the present embodiment nips the first housing case 3 and the second housing case 4 from the outside in the width direction, and a plurality of the fixing tools 8 are provided in the depth direction and the vertical direction.

Next, the assembly of the battery module 1 will be described. First, as illustrated in FIG. 4, a worker houses the battery cells 2 in the first battery cell group 2A in the first housing case 3. Here, the worker houses each of the battery cells 2 in each of the housing space portions 31 so that the first insertion piece 32 side is the positive electrode terminal 22+, and the second insertion piece 33 side is the negative electrode terminal 22−, in the depth direction. In this manner, the battery cells 2 are housed in the housing space portions 31 so that the positive electrode terminals 22+ of the battery cells 2 in the first battery cell group 2A are aligned in the upward direction, and the negative electrode terminals 22− of the battery cells 2 in the first battery cell group 2A are aligned in the upward direction. Next, as illustrated in FIG. 5, the worker houses the battery cells 2 in the second battery cell group 2B in the second housing case 4. Here, the worker houses the battery cells 2 in the housing space portions 41 so that the first insertion hole 42 side is the negative electrode terminal 22−, and the second insertion hole 43 side is the positive electrode terminal 22+, in the depth direction. In this manner, the battery cells 2 are housed in the housing space portions 41 so that the positive electrode terminals 22+ of the battery cells 2 in the second battery cell group 2B are aligned in the upward direction, and the negative electrode terminals 22− of the battery cells 2 in the second battery cell group 2B are aligned in the upward direction.

Next, the worker disposes the first housing case 3 that houses the battery cells 2 in the first battery cell group 2A and the second housing case 4 that houses the battery cells 2 in the second battery cell group 2B so that the first housing case 3 and the second housing case 4 are separated and facing each other in the width direction. In this process, the worker makes the first housing case 3 and the second housing case 4 face each other so that the first insertion piece 32 faces the first insertion hole 42 and the second insertion piece 33 faces the second insertion hole 43 in the width direction. Next, as illustrated in FIG. 2, the worker disposes the base unit 51 of the voltage detector 5 and the pair of terminal electrodes 6 and 7 between the first housing case 3 and the second housing case 4 so that the voltage detector 5 and the pair of terminal electrodes 6 and 7 are overlapped with the electrode terminals 22 to be connected in the width direction, respectively. Next, the worker brings one of the housing cases of the first housing case 3 and the second housing case 4 close to the other housing case in the width direction. Consequently, the first insertion piece 32 is inserted into the first insertion hole 42, and the second insertion piece 33 is inserted into the second insertion hole 43. In this process, because the shapes of the first insertion piece 32 and the second insertion piece 33 are different, in the present embodiment, the second insertion piece 33 cannot be inserted into the first insertion hole 42. Thus, it is possible to prevent the electrode terminals 22 of the battery cell 2 of the first housing case 3 and the electrode terminals 22 of the battery cell 2 of the second housing case 4 from being connected in an erroneous direction. The worker can further bring the first housing case 3 and the second housing case 4 closer to each other, and connect (bring into contact) the facing electrode terminals 22 of the battery cell 2 in the first battery cell group 2A and the electrode terminals 22 of the battery cell 2 in the second battery cell group 2B. In this manner, the battery cells 2 are connected in series. In this process, the base unit 51 is held between the electrode terminals 22 that are connected facing each other, and the pair of terminal electrodes 6 and 7 are held between the electrode terminals 22 and the opposite surfaces 34 and 44, respectively. Consequently, the voltage detection conductors 52 and the pair of terminal electrodes 6 and 7 that are provided on the base unit 51 are connected to the electrode terminals 22 to be connected.

Next, the worker fixes the first housing case 3 and the second housing case 4 using the fixing tools 8, while the facing electrode terminals 22 of the battery cell 2 in the first battery cell group 2A and the electrode terminals 22 of the battery cell 2 in the second battery cell group 2B are connected. In this manner, the assembly of the battery module 1 is completed. Consequently, the relative movement of the first housing case 3 and the second housing case 4 is restricted, and the connection between the facing electrode terminals 22 of the battery cell 2 in the first battery cell group 2A and the electrode terminals 22 of the battery cell 2 in the second battery cell group 2B is maintained.

In this manner, in the battery module 1 of the embodiment described above, the first housing case 3 and the second housing case 4 are in a fixed state. Consequently, the positive electrode terminal 22+ of each of the battery cells 2 in the second battery cell group 2B that is inclined relative to the first battery cell group 2A, is connected to the facing negative electrode terminal 22− in the first battery cell group 2A. Moreover, the negative electrode terminal 22− of each of the battery cells 2 in the second battery cell group 2B is connected to the facing positive electrode terminal 22+ of each of the battery cells 2 in the first battery cell group 2A. Thus, it is possible to directly connect the battery cells 2 and 2 without using a bus bar for connecting the electrode terminals 22 in the first battery cell group 2A with the electrode terminals 22 in the second battery cell group 2B. Consequently, it is possible to reduce the manufacturing cost of the battery module 1. Moreover, a process of fixing the bus bars to the electrode terminals 22 is not necessary during the assembly of the battery module 1, thereby reducing the manufacturing time and improving the workability. Furthermore, it is possible to reduce the weight of the battery module 1 because the metal bus bars will not be used.

When the bus bar is used to connect the electrode terminals 22, and a nut or the like is used to fasten the bus bar to the electrode terminals 22, a working space to use the fastening tool is required in the battery module 1. Moreover, when the bus bar is welded to the electrode terminals 22, space for welding the bus bar is required in the battery module 1. In the battery module 1 of the above embodiment, because the bus bar is not used, it is possible to obtain the space-saving battery module 1.

In the battery module 1 of the embodiment described above, voltage information of each the battery cells 2 can be output to the outside, through the voltage detector 5 that is interposed between the first housing case 3 and the second housing case 4, and that includes the base unit 51 provided with the voltage detection conductors 52. Consequently, by interposing the base unit 51 between the electrode terminals 22 and 22, it is possible to connect the voltage detection conductors 52 with the electrode terminals 22. In this manner, when the voltage detection conductors 52 are fixed to the first housing case 3 and the second housing case 4 during the assembly of the battery module 1, the base unit 51 is interposed between the electrode terminals 22 and 22. Consequently, it is possible to reduce the manufacturing time, and improve the workability. Moreover, it is possible to output the voltage information of the battery cell 2 to the outside by interposing the base unit 51 having the sheet-like shape between the first housing case 3 and the second housing case 4. Hence, it is possible to obtain the space-saving battery module 1.

The voltage detection conductors 52 connected to the electrode terminals 22 are provided on a single base unit 51. Thus, the electrode terminals 22 are connected with the voltage detection conductors 52, by interposing the base unit 51 between the electrode terminals 22 and 22. Consequently, it is further possible to reduce the manufacturing time and improve the workability.

In the present embodiment, the facing electrode terminals 22 and 22 are directly connected. However, it is not limited thereto, and the voltage detector 5 may be interposed between the electrode terminals 22 and 22 connected facing each other. In this case, electrode connection conductors may be formed on both surfaces of the base unit 51 in the width direction so as to face each other in the width direction, and the facing electrode connection conductors may be connected using the connection conductor provided on the base unit 51. In this manner, the facing electrode terminals 22 and 22 are connected to the electrode connection conductors, respectively. Consequently, it is possible to connect the facing electrode terminals 22 and 22 via the voltage detector 5.

Each of the fixing tools 8 of the present embodiment is not particularly limited as long as the fixing tool 8 can fix the first housing case 3 and the second housing case 4. For example, the fixing tool 8 may be a binding band for binding the first housing case 3 and the second housing case 4 together, a casing for storing the first housing case 3 and the second housing case 4 together, a fastening tool for fixing the first housing case 3 and the second housing case 4 directly, and the like.

The base unit 51 of the present embodiment is provided with the voltage detection conductors 52 connected to the electrode terminals 22. However, the base unit 51 of the present embodiment is not limited thereto, and one of the voltage detection conductors 52 may be provided on a single base unit 51, and the voltage detector 5 may be configured of a plurality of the base units 51.

In the above embodiment, the electrode terminals 22 are elastically deformable. However, it is not limited thereto, and an elastic conducting material having elastic conductivity such as a conductive rubber may be interposed between the facing electrode terminals 22 and 22.

In the embodiment described above, the voltage detection conductors 52 are provided on the base unit 51 having the sheet-like shape, as the voltage detector 5. However, it is not limited thereto, and the voltage detection conductors 52 may be wires coated with an insulator. In this case, one of the ends of the voltage detection conductor 52 may be electrically connected to a portion between the facing electrode terminals 22 and 22, and the other end of the voltage detection conductor 52 may be electrically connected to a terminal, which is not illustrated, of the connector 53.

The battery module according to the present embodiment exhibits advantageous effects of being able to connect the battery cells without using a bus bar.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery module, comprising:
   a plurality of battery cells each having two electrode terminals of positive and negative electrode terminals;
   a first housing case that houses a first battery cell group formed of a part of the battery cells;
   a second housing case that houses a second battery cell group formed of the battery cells different from the battery cells in the first battery cell group; and
   a fixing tool that fixes the first housing case and the second housing case in a fixed state by making the electrode terminals in the first battery cell group face the electrode terminals in the second battery cell group, wherein
   the second battery cell group is housed in the second housing case while being inclined relative to the first battery cell group,
   the positive electrode terminal of each of the battery cells in the second battery cell group is connected to the negative electrode terminal of each of the battery cells in the first battery cell group facing the positive electrode terminal of each of the battery cells in the second battery cell group, and
   the negative electrode terminal of each of the battery cells in the second battery cell group is connected to the positive electrode terminal of each of the battery cells in the first battery cell group facing the negative electrode terminal of each of the battery cells in the second battery cell group.

2. The battery module according to claim 1, further comprising:
   a voltage detector interposed between the first housing case and the second housing case in the fixed state, the voltage detector outputting voltage information of the battery cells to outside.

3. The battery module according to claim 2, wherein the voltage detector includes
   a base unit having a sheet-like shape interposed between the electrode terminals in the first battery cell group and the electrode terminals in the second battery cell group, the electrode terminals in the first battery cell group and the electrode terminals in the second battery cell group being connected facing each other, and
   a voltage detection conductor provided on the base unit, the voltage detection conductor being connected to at least one of the electrode terminals, of the electrode terminals connected facing each other.

4. The battery module according to claim 3, wherein a plurality of the voltage detection conductors are provided on the base unit.

\* \* \* \* \*